(12) United States Patent
Lecomte et al.

(10) Patent No.: US 7,460,216 B2
(45) Date of Patent: Dec. 2, 2008

(54) SURFACE STRAIN MEASURING DEVICE

(75) Inventors: Jean-Claude Lecomte, Saint Nizier du Moucherotte (FR); Romain Fayolle, Grenoble (FR)

(73) Assignee: INSIDIX, Seyssins (FR)

( * ) Notice: Subject to any disclaimer, the term of this patent is extended or adjusted under 35 U.S.C. 154(b) by 190 days.

(21) Appl. No.: 11/596,725

(22) PCT Filed: Nov. 23, 2005

(86) PCT No.: PCT/FR2005/001274

§ 371 (c)(1),
(2), (4) Date: Nov. 16, 2006

(87) PCT Pub. No.: WO2005/119171

PCT Pub. Date: Dec. 15, 2005

(65) Prior Publication Data

US 2008/0055583 A1    Mar. 6, 2008

(30) Foreign Application Priority Data

May 24, 2004  (FR) .................................. 04 05633

(51) Int. Cl.
*G01L 1/24* (2006.01)
*G01B 11/16* (2006.01)
*G01V 3/00* (2006.01)

(52) U.S. Cl. .................. 356/32; 356/601; 356/604; 356/237.2; 250/216; 324/304

(58) Field of Classification Search ......... 356/601–602, 356/609, 612, 630–632, 513, 32–35; 250/216, 250/234, 227.11; 435/6, 306; 324/300, 304; 73/105

See application file for complete search history.

(56) References Cited

U.S. PATENT DOCUMENTS 5,071,251 A * 12/1991 Hochberg et al. ........... 356/513

(Continued)

FOREIGN PATENT DOCUMENTS

EP    0 740 139 A1   10/1996

(Continued)

OTHER PUBLICATIONS

L. X. Yang et al.; "Precision measurement and nondestructive testing by means of digital phase shifting speckle pattern and speckle pattern shearing interferometry;" *Measurement*; vol. 16, No. 3, pp. 149-160; Nov. 1995.

(Continued)

*Primary Examiner*—Sang Nguyen
(74) *Attorney, Agent, or Firm*—Oliff & Berridge, PLC

(57) ABSTRACT

The device enables strains of at least one surface (1) of a sample (2) to be measured versus temperature. Strains in a direction perpendicular to a predetermined plane, for example the plane of the surface (1), are measured by composite images. Strains in said plane are measured by image correlation. The measurements by image correlation and by composite images use a common visible light detection camera (3). The sample (2) is arranged in an enclosure (6) transparent at least locally to visible light (L). At least one infrared emitter (9) enables an infrared light to be created in a spectral band for a large part not detected by the camera (3).

18 Claims, 3 Drawing Sheets

U.S. PATENT DOCUMENTS

| | | | | |
|---|---|---|---|---|
| 5,939,709 | A | * | 8/1999 | Ghislain et al. ............. 250/216 |
| 6,097,477 | A | | 8/2000 | Sarrafzadeh-Khoee |
| 6,362,881 | B1 | * | 3/2002 | Pickering et al. ............ 356/369 |
| 6,389,886 | B2 | * | 5/2002 | Daniels et al. ................ 73/105 |
| 6,564,166 | B1 | | 5/2003 | Ume et al. |
| 6,690,473 | B1 | * | 2/2004 | Stanke et al. ................ 356/601 |
| 7,198,900 | B2 | * | 4/2007 | Woudenberg et al. .......... 435/6 |
| 7,282,911 | B2 | * | 10/2007 | Xiang et al. ................ 324/304 |

FOREIGN PATENT DOCUMENTS

| | | |
|---|---|---|
| WO | WO 97/25590 A1 | 7/1997 |
| WO | WO 98/55826 A2 | 12/1998 |
| WO | WO03/093760 A1 | 11/2003 |
| WO | WO 2004/015368 A1 | 2/2004 |

OTHER PUBLICATIONS

Adel F. Bastawros et al.; "Transient Thermal Strain Measurements in Electronic Packages;" *Hybrids and Manufacturing Technology*; vol. 13, No. 4; pp. 961-963; Dec. 1990.

D. Coburn et al.; "Digital correlation system for nondestructive testing of thermally stressed ceramics;" *Applied Optics*; vol. 34, No. 26; pp. 5981-5982; Sep. 1995.

* cited by examiner

SURFACE STRAIN MEASURING DEVICE

BACKGROUND OF THE INVENTION

The invention relates to a device for measuring topographies and strains of at least one surface of a sample, comprising first measuring means for measuring topographies and movements that are perpendicular to a predetermined plane, second measuring means for measuring strains that are in a plane defined by the surface, by image correlation, the first and second measuring means using at least one common light detection camera, heating means and means for measuring the temperature of the sample.

STATE OF THE ART

Materials and assemblies, for example electronic and microelectronic materials and assemblies, usually undergo strains due to the effect of thermomechanical effects during fabrication, during assembly on a printed circuit board and in the course of operation. These strains symptomatic of internal stresses may give rise to defects, for example interface defects, surface warpage or opening of electric circuits at the level of the inter-connections between different components of a microelectronic and/or electronic assembly.

These strains then have to be characterized not only at ambient temperature but also at different temperatures in transient or stationary conditions. The strains that prefigure a stressed state of the materials or of the component and its assembly for example, at different temperatures, are in fact useful to be known for development of new materials, components and production processes, assessment of the stresses arising from phase changes, assistance in thermomechanical simulation, dependability assessment, behaviour and operation analysis, malfunction analysis, etc . . . .

The temperature profiles imposed on the products in industrial processes are typically applied when component assembly (brazing, gluing, packaging resin casting, etc.) is performed by running the components through different isothermal chambers, and the speed at which passage takes place through the chambers thus determines the temperature variation rate seen by the sample. Component fabrication processes, like the principle of movement of the sample on assembly, do however make precise measurement of these strains difficult. Moreover, static devices for measuring purposes do not usually enable temperature variation rates of more than 1° C./s to be achieved.

The document U.S. Pat. No. 6,097,477 describes a method for measuring the strains of a surface of an object in a direction perpendicular to the surface and in the two orthogonal directions in the plane of the surface. The method uses three laser beams and three cameras and the strains are determined by means of correlations of images recorded by the cameras.

The document WO03,093,760 describes a system for measuring strains of a microelectronic assembly in a measuring plane by correlation of images with highlighting of patterns proper to the surface by speckle effect. The system comprises an environmental chamber to perform, for example, thermal cycles and thus measure the strains according to the temperature. The characteristic length of a surface pattern is linked to the roughness of the surface.

The documents WO9,855,826 and WO9,725,590 describe techniques for measuring strains in a direction perpendicular to a plane of a surface according to the temperature using a structured illumination and measurement of Moiré type geometric interference figures. However, these techniques create an uncertainty when the strain creates an offset greater than the characteristic length of the structured illumination. The amplitudes, resolution and field of view depend on the characteristic length fixed by the pitch of the periodic pattern.

The document WO2004/015,368 describes a measuring instrument designed for determining strains and dimensions of microelectronic components. A first light source enables an analysis of the image correlation type to be performed. A second light source enables a Moiré type analysis to be performed perpendicularly to the plane of the sample. A sample support comprises a device for stressing the sample, for example by electric power or by mechanical strain. The sample support comprises a thermometer.

The document EP0,740,139 describes a device for in-situ measurement of mechanical voltages of layers. The device comprises an outside case, for example made of quartz, wherein an inside metal case is arranged. The two cases are connected by means of support means having low electrical and thermal conductivities and a low thermal expansion coefficient. The inside case is cooled, for example by a fluid such as helium. The temperature can be adjusted by servo-control.

The different heating means used do not enable a good homogeneity of the temperature in the sample to be obtained.

None of these techniques enables the topography and strains in the plane of the surface and along an axis perpendicular to the plane observed to be measured in absolute and relative manner. In particular, the Moiré technique does not enable measurements to be made with fields of vision of variable dimensions. It is in fact difficult to switch from a measurement field of 1 cm$^2$ to a field of vision of 30×30 cm$^2$ with the same Moiré type device.

In addition, the different assembled parts designed to be characterized, for example microelectronic and electronic assemblies, generally present level differences between the surfaces that are in the order of a millimeter, whereas the strain amplitudes that have to be measured range from 1 µm to a few hundred microns, moreover at different temperatures in stationary or transient conditions. These strain amplitudes are representative of the fabrication, assembly or operating conditions of the electronic components, for example. Numerous applications require a very high field depth over resolution ratio (about 1500 for example), which none of the above-mentioned techniques allows.

OBJECT OF THE INVENTION

It is an object of the invention to remedy these shortcomings and, in particular, to propose a combination of optical measuring means for measuring the topography and absolute and relative strains in the plane and along an axis perpendicular to this plane (for the different assembled parts). These optical measuring means are associated with a thermal stressing means that enables stressing to be performed representative of the thermal gradients encountered during fabrication, assembly or operation of the components and printed circuit boards for example, in both stationary and transient conditions, without disturbing the measurements by thermal or mechanical variations of the heating means. It is also an object of the invention to integrate in a single device a means enabling measurements to be made with variable measurement field ranges, for example comprised between 1 cm$^2$ and 30×30 cm$^2$, for level differences between the surfaces that are in the region of one millimeter, whereas the strain amplitudes that have to be measured range from less than 1 µm to a few hundred microns.

According to the invention, this object is achieved by the accompanying claims and, more particularly, by the fact that the first measuring means comprise means for projecting composite images by illuminating the surface with a sequence of images, each image comprising a periodic pattern, the periodic patterns of the different images of the sequence of images respectively presenting pitches of different periodicities, the device comprises an enclosure transparent at least locally to visible light, wherein the sample is arranged, the heating means comprising at least one infrared emitter creating an infrared light not detected by the camera.

It is a further object of the invention to provide a method of using a device according to the invention, comprising assignment to each volume element of a reference code representative of grey levels detected by the camera when a first projection of the sequence of images is performed, and correlation of said reference codes with data acquired by the camera when subsequent projections of the sequence of images are performed on the surface of the sample so as to obtain the co-ordinates of said surface.

BRIEF DESCRIPTION OF THE DRAWINGS

Other advantages and features will become more clearly apparent from the following description of different embodiments of the invention given as non-restrictive examples only and represented in the accompanying drawings in which.

DESCRIPTION OF PARTICULAR EMBODIMENTS

Figure 1:
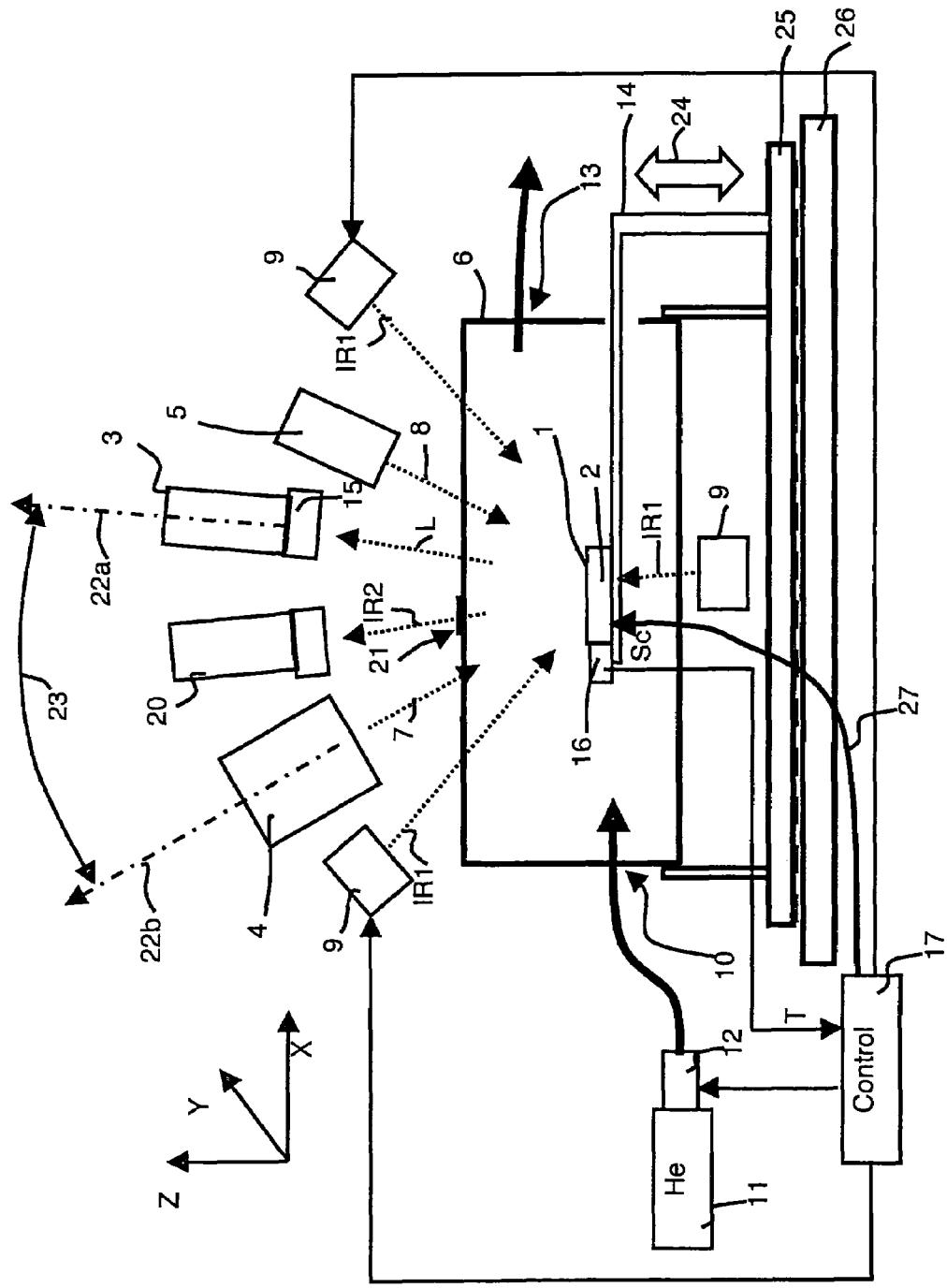
FIG. 1 is a schematic representation of a particular embodiment of a strain measuring device according to the invention.

FIG. 1 represents a device for measuring strains of a surface 1, for example a flat surface, of a sample 2 according to the temperature. The device comprises a visible light detection camera 3 and a first light source 4 for structured illumination of the sample 2 with a structured light to measure movements or strains that are perpendicular to the plane of the surface 1 of the sample 2.

Figure 5:
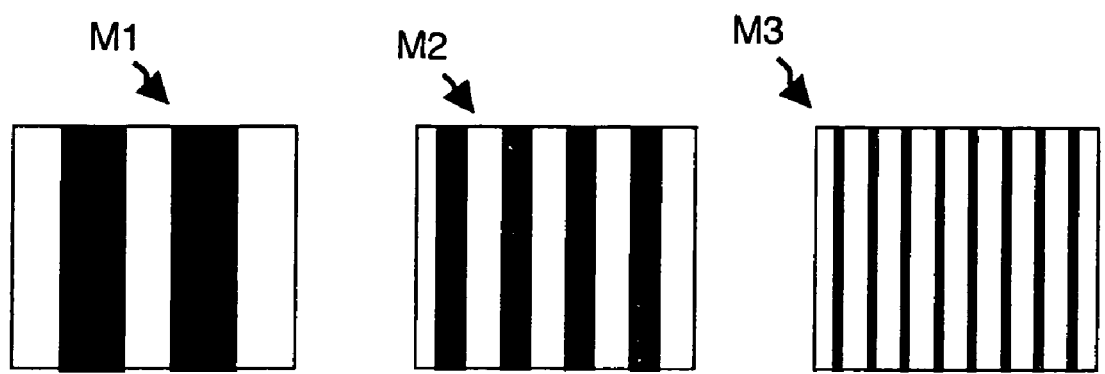
FIG. 5 illustrates a particular embodiment of periodic patterns.

The technique used for structured illumination comprises projection of composite images. This technique is carried out by illumination of the surface 1 with a sequence of images. As represented in FIG. 5, each image comprises a periodic pattern M (M1, M2, M3) and the periodic patterns of the different images of the sequence of images respectively present pitches of different periodicities. Such a technique in particular enables the topography to be defined in absolute manner, unlike Moiré type techniques that are sensitive only to differences of topography and, in addition, only to differences smaller than a certain height.

In FIG. 1, an axis Z represents the direction perpendicular to the plane of the surface 1. The first light source 4 is for example formed by a white light projector of LCD (Liquid Crystal Display) or DMD (Digital Micromirror Device) type or a laser projector. The device comprises a second light source 5 for illumination of the sample 2 by a homogeneous light, that is white or coloured, coherent or not, to measure, in known manner, strains that are in the XY plane of the surface 1 of the sample 2 by image correlation. The second light source 5 is for example formed by light-emitting diodes. The camera 3 is also used for measurement by image correlation.

The strain measuring technique by image correlation is based on optical non-homogeneities of a surface, i.e. variations of the reflection and absorption properties in the plane of the surface, leading, for example to variations of the grey levels of a recorded image. When a strain of the surface 1 occurs in the plane of the surface, the non-homogeneities also move and the camera 3 records a different image from the image recorded before the strain. Comparison of the two images with one another or with a reference image enables the strains in the plane of the surface to be determined. In this way, the treatment associated with the image correlation method takes account of the differences of the two images of the surface 1 recorded under the same illumination conditions respectively at two different times and under different sample stressing conditions.

In the particular embodiment represented in FIG. 1, the sample 2 is arranged in an enclosure 6 transparent to visible and infrared light, enabling transmission of light beams 7 and 8 originating respectively from the light sources 4 and 5 and enabling transmission of the light L emitted by the sample 2 and detected by the camera 3 that is arranged outside the enclosure 6. The enclosure 6 is for example made of silica quartz, poor in impurities such as for example hydroxide groupings OH, so as to minimise the absorption of short and medium infrared radiation. Outside the transparent enclosure 6, there is arranged at least one infrared emitter that is preferably able to be oriented to direct it onto the sample 2.

The infrared emitter(s) create(s) an infrared light in a spectral band for a large part not detected by the camera 3 and can also be arranged inside the enclosure. In this case, the enclosure 6 can be opaque to infrared light. The enclosure 6 must however be transparent, at least locally, to visible light L. The combination of heating by infrared and of the transparent enclosure 6 notably enables the sample to be heated without disturbing the camera 3 and a very good temperature homogeneity to be obtained in the sample. Dynamic measurement, i.e. simultaneously with the temperature changes, can thus be performed with great precision.

In FIG. 1, the infrared emitters are formed by two lamps 9 emitting infrared radiation IR1 and arranged outside the transparent enclosure 6, on each side of the enclosure 6, enabling the sample 2 to be heated by radiation. In a preferred embodiment, the device comprises eight infrared lamps arranged symmetrically with respect to the centre of the sample, enabling the sample to be heated in uniform manner without creating thermal gradients due to illumination by asymmetrical illumination. As the enclosure 6 is transparent to infrared light, the radiation emitted by the infrared lamps 9 is transmitted by the enclosure 6 to the sample 2. The surface of the enclosure 6 preferably presents a great flatness and a low roughness facilitating transmission of the infrared radiation IR and of the light beams 7 and 8.

In FIG. 1, the enclosure 6 comprises an inlet 10 for a coolant, for example helium, connected to a tank 11 by means of a valve 12. The enclosure 6 comprises in addition an outlet 13 enabling the coolant to be removed from the enclosure. Cooling can also be performed by projecting nitrogen or a mixture containing humidified nitrogen, or even damp air, and also by means of thermoelectric effects.

In FIG. 1, the sample 2 is arranged on a sample support 14 mechanically decoupled from the enclosure 6, i.e. the support 14 is not in direct contact with the enclosure 6. Any strains and movements of the enclosure 6 are thus not transmitted to the sample 2. The support 14 preferably has a low thermal inertia in order to enable the temperature of the sample to be controlled and quickly modified. The support 14 is preferably transparent to infrared radiation IR and, for example, is made of silica quartz. The support 14 can for example be fixed onto a first marble plate 25 supported by an air cushion above a second marble plate 26, as represented in FIG. 1.

Figure 2:
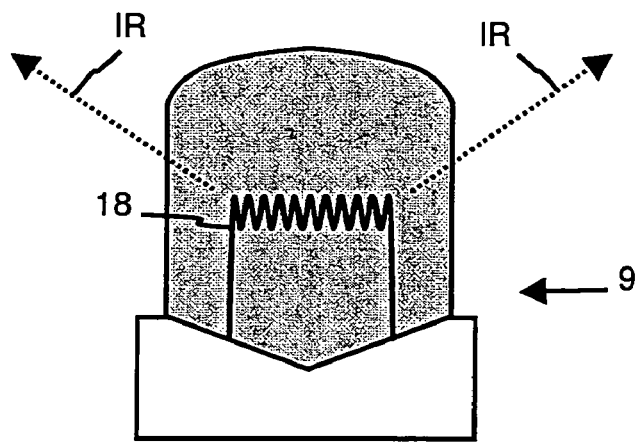
FIG. 2 represents a particular embodiment of an infrared lamp of a device according to the invention.

The camera 3 and infrared lamps 9 can be adapted so that the spectrum of the lamps 9 does not coincide with the spectrum detected by the camera 3. The camera 3 preferably comprises a red and infrared light filter 15 to prevent light detection disturbances due to the infrared radiation IR emitted by the infrared lamps 9. The infrared lamps 9 preferably comprise a filament 18 made of carbon braid, as represented in FIG. 2, creating an infrared light IR1 of a mean wavelength of about 2 micrometers. The infrared emitter thus creates an infrared light in a spectral band for a large part not detected by the camera.

The device according to the invention makes it possible to measure shapes and strains of visible surfaces of a sample, for example a microelectronic assembly, which can be made up of several parts. The surfaces can be arranged at different heights and with different angles with respect to the device and are substantially flat, at least locally.

Measurement is performed under different conditions or changes of conditions corresponding physical quantities of external stressing of the sample such as, for example, temperature, pressure, humidity, a magnetic field, an electromagnetic wave (microwave), a mechanical stress, etc. These stressings can cause different physical processes such as, for example, heat dissipation or changes of state, for example polymerization of materials. The measuring device enables these physical processes to be characterized, as described above. The different stresses can be generated by any means in known manner.

All the above-mentioned stressings of the sample can be performed periodically, for example by means of the control device 17. Thus, operation of the electronic circuit constituting the sample 2 can be interrupted and resumed in periodic manner, when optical measurements are made.

When the sample is an electronic component, the process can comprise making said electronic component operate. Thus, measurement by means of the first, second and/or third measuring means can be performed when the electronic component is operating, which constitutes a particular way of stressing the sample. The device can, for example, comprise an electrical connection 27 between the control device 17 and sample 2, transmitting control signals Sc and enabling the electronic circuit constituting the sample 2 to be made to operate.

The device comprises sensors or detectors for measuring physical stressing quantities of the sample, for example pressure, temperature, humidity, magnetic field, electrical field, heat dissipation, phase change, polymerization, etc. The physical stressing quantity of the sample can be controlled passively (for example the temperature can be controlled by an isolation device) or actively by means of a corresponding sample stress generation device (for example by a heat source), while enabling the device to perform the topography and strain measurements at the same time as the sample is stressed, in permanent or transient conditions. For example, a magnetic field can be applied by means of a coil or a controlled atmospheric pressure can be created in the enclosure 6.

A control device preferably enables this stress generation to be servo-controlled by the corresponding measured or detected physical quantity. In a preferred embodiment, the device comprises a temperature measuring element and the stress generation device is formed by heating and cooling elements, enabling the temperature to be controlled.

In the embodiment represented in FIG. 1, the device comprises a thermometer 16 arranged on the sample 2 to measure the temperature T of the latter. Several thermometers can be arranged at several distinct locations. Signals representative of the temperature T or temperatures are transmitted to a control device 17 by servo-control of the heating and cooling means by the temperature T. In the embodiment represented in FIG. 1, the infrared lamps 9 and helium valve 12 are controlled by the control device 17 so as to establish or maintain a preset temperature T or to make the temperature T vary with a preset variation rate.

The device according to the invention enables the temperature to be made to vary with a rate of up to ±3° C. and thus enables the strains versus the temperature T to be measured continuously, i.e. without having to wait for thermal equilibrium to be established after each temperature change.

Figure 3:
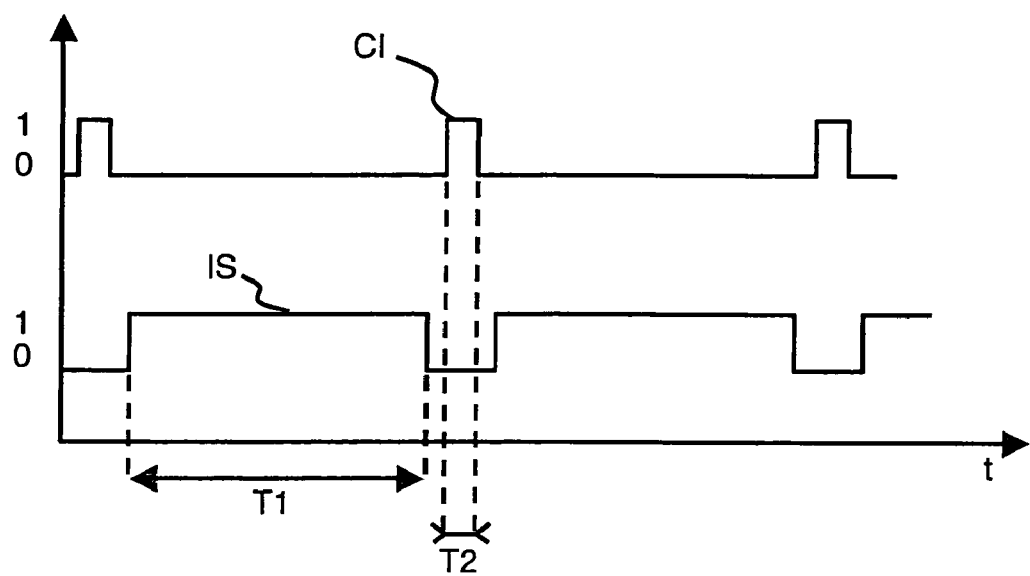
FIG. 3 illustrates a particular embodiment of a method of using a device according to the invention, comprising an activation phase alternation.

In a particular embodiment, the measurements by structured illumination and by image correlation are performed alternately. FIG. 3 illustrates alternative activation of measurements by structured illumination (IS) and by image correlation (CI) versus time t. The first measuring means by structured illumination are activated during a first phase with a duration T1 (the curve IS then takes the value 1 in FIG. 3). Then the second measuring means by image correlation are activated during a second phase with a duration T2 (the curve CI then takes the value 1 in FIG. 3). The duration T1 is for example comprised between 4 s and 5 s, whereas the duration T2 can be about 200 ms. Measurement by structured illumination typically comprises projection of a series of images in grey or coloured levels, for example twenty images, by means of the first light source 4. Measurement by image correlation comprises illumination of the sample by means of the second light source 5. Operation of the detection camera 3 is synchronised with the first light source 4 and second light source 5 respectively during the first and second time durations. Thus the detection camera 3 enables images respectively used for the first and second measurements to be acquired alternately. The camera can create images of different resolutions and the acquisition parameters can be different for the first and second measurements.

In the case where alternation of the measurements has a sufficiently small period, for example about 5 s or less, and the variation rate is sufficiently high, for example about ±3° C., the strains of the microelectronic sample can be measured in transient situation and in dynamic manner, i.e. before the sample reaches thermal equilibrium.

Figure 4:
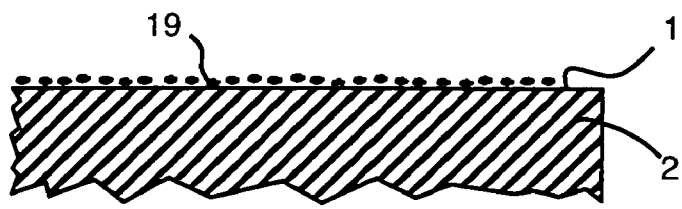
FIG. 4 illustrates a particular embodiment of a method of using a device according to the invention, comprising deposition of micrometric grains.

The strain or topography measuring techniques by structured light are conventionally applied to rough surfaces having a homogeneous aspect, i.e. having homogeneous light reflection, absorption and diffusion properties. The strain measuring technique by image correlation is based on the non-homogeneities of a surface, i.e. variations of the reflection, absorption and diffusion properties in the plane of the surface. In order to optimise simultaneous application of the two techniques, a method for using the device according to the invention comprises deposition of micrometric grains 19 on the surface 1 of the sample 2, as represented in FIG. 4, for example in the form of a powder or paint comprising for example $CaCO_3$ or chalk. The grains 19 are deposited in such a way that the grains 19 are bonded to the surface 1, so that they follow the strains of the surface. For example the grains can be deposited in the form of aerosols. Deposition of the grains is preferably reversible, i.e. the grains can be eliminated after the strains have been measured. The surface 1 of the sample 2 is thus made non-homogeneous on a micrometric scale which enables measurement by image correlation, and keeps its homogeneous aspect on a millimetric scale which enables measurement by structure illumination. Measurement by image correlation can be optimised by illumination with a grazing incident angle and, possibly with a monochromatic light, which can highlight the speckled aspect of the surface.

The structured light can in fact be of sinusoidal type presenting, on the surface of the sample, a pitch of about one millimeter, whereas the scale of the non-homogeneities taken into account in image correlation can be micrometric. Thus, deposition of micrometric grains does not disturb measurement by structured light. In the case where the deposited grains are of larger size, it may be necessary, for processing of the image associated with measurement by structured light, to take account, in calculation, of the non-homogeneities on a micrometric scale, which can be done up to a certain size of grains. Deposition can be performed by a reversible projection enabling the initial state of the surface 1 to be re-established after measurement. In the case where the surface 1 is polished and very reflecting or in the case where the surface presents a very great non-homogeneity, deposition of grains enables in particular measurements to be made independently of the surface properties.

For acquisition of images corresponding to measurement by structured light, it is an identification of events on the sample with variations on a millimetric scale, for example for an observed field having lateral dimensions comprised between 2 cm and 15 cm, whereas for measurement by image correlation, a micrometric resolution is necessary. It is thus possible to adapt the resolution of the camera to acquisition of the respective images, which in particular enables the integration time for measurement corresponding to structured illumination to be reduced. In another embodiment, the resolution of the camera is always micrometric. In the latter case, the micrometric signals can be filtered by means of image processing for processing corresponding to structured illumination.

In the case where the surface 1 of the sample 2 is larger than the field of vision of the camera 3, for a predetermined required resolution, it is possible to perform several measurements respectively of several parts of the surface 1 of the sample 2 using appropriate optical means, for example objectives, zooms or microscopes. Image acquisition can thus be performed field by field. For this, rather than moving the measuring means with respect to the sample 2, it is preferable to move the sample 2, and if necessary the enclosure 6, by means of a device comprising two plates of polished granite in relative movement, for example movable by means of an air cushion established between the two plates.

The invention is not limited to the embodiments represented. In particular, the enclosure 6 can be transparent only locally and to visible light L only.

In another particular embodiment of the invention, the device comprises third measuring means for detecting an infrared radiation IR2 emitted by the sample, for example an infrared camera or an infrared detector 20 (FIG. 1) sensitive to radiation having a wavelength comprised between 8 and 16 micrometers. The third measuring means are preferably arranged outside the enclosure 6. In this case, the enclosure 6 comprises, for example, a window 21 transparent to the infrared radiation emitted by the sample 2, i.e. to wavelengths comprised for example between 8 and 16 micrometers, for example for a microbolometer detector 20.

The infrared radiation emitted by the sample enables the temperature of the sample to be determined and, in addition, enables thermo-elastic strains, damages, creation of irreversible defects and impacts inside and at the surface of the sample to be characterized, by means of the corresponding dissipated heat. In this case, the heating means preferably comprise means for making the temperature vary periodically.

When the infrared emitters are arranged outside the enclosure 6, the enclosure 6 can be transparent, at least locally, to the heating wavelengths which are typically about 2 micrometers. Moreover, the enclosure 6 can be transparent to the temperature measurement wavelengths by infrared which are typically comprised between 8 and 16 micrometers. The enclosure 6 thus comprises, for example, several windows transparent to wavelengths of about 2 micrometers and/or from 8 to 16 micrometers, each of these windows corresponding to a heating infrared transmitter arranged facing the window or to a temperature measuring means such as a pyrometer or an infrared camera.

The method for using the device preferably comprises assignment to each volume element of a reference code representative of grey levels detected by the camera 3 when a first projection of the sequence of images is performed. Then said reference codes are correlated with data acquired by the camera during subsequent projections of the sequence of images on the surface 1 of the sample 2, so as to obtain the co-ordinates of said surface 1. These steps can for example be performed by means of the control device 17 represented in FIG. 1.

Assigning a representative reference code to each volume element can be associated with a calibration step in which a reference surface, for example a flat and even surface, is arranged at different heights in the field of vision. Each height corresponds to a level along the Z-axis (FIG. 1). For each height, a sequence of images is projected onto the reference surface and the reference code is determined from the grey levels detected by the camera 3 when the sequence of images is projected onto the reference surface. Each image acquisition of the camera, for a given level along the Z-axis, corresponds to a plurality of volume elements arranged in the same plane. A plurality of image acquisitions thus corresponds to a succession of parallel planes. Each point of the volume of the field of vision therefore has a volume element associated thereto. Assignment can in principle also be performed in theoretical manner, taking account of the characteristics of the whole of the device.

In order to vary the field of measurement of the measuring means 3, 20, the device can comprise actuators for relative movement of the sample with respect to the measuring means 3, 20, to the heating means 9 and to light sources 4, 5. Thus, as represented by the arrow 24 in FIG. 1, the sample can for example be moved along the Z-axis. In another embodiment, the camera 3 and light source 4 are moved along their own longitudinal axes, as represented by the arrows 22a and 22b in FIG. 1. A relative rotational movement of the camera 3 and light source 4 can be envisaged, as represented by the arrow 23 in FIG. 1.

The invention claimed is:

1. Device for measuring topographies and strains of at least one surface of a sample, comprising:
    first measuring means for measuring topographies and movements that are perpendicular to a plane defined by a surface of the sample, the first measuring means utilizing structured illumination, second measuring means for measuring strains that are in the plane defined by the surface of the sample, the second measuring means utilizing image correlation, the first measuring means and the second measuring means utilizing at least one common light detection camera, heating means and means for measuring the temperature of the sample, wherein the first measuring means comprise means for projecting composite images by illuminating the surface with a sequence of images, each image comprising a periodic pattern, the periodic patterns of the different images of the sequence of images respectively presenting pitches of different periodicities, the device comprises an enclosure transparent at least locally to visible light, wherein the sample is arranged, the heating means comprising at least one infrared emitter creating an infrared light not detected by the camera.

2. Device according to claim 1, comprising means for assignment to each volume element of a reference code representative of grey levels detected by the camera when a first projection of the sequence of images is performed, and correlation of said reference codes with data acquired by the camera when subsequent projections of the sequence of images are performed on the surface of the sample.

3. Device according to claim 1, comprising third measuring means for detecting an infrared radiation emitted by the sample.

4. Device according to claim 3, wherein the third measuring means are arranged outside the enclosure, the enclosure comprising a window transparent to the infrared radiation emitted by the sample.

5. Device according to claim 1, comprising means for relative movement of the sample with respect to the measuring means, to the heating means and to light sources so as to make the field of measurement of the measuring means variable.

6. Device according to claim 1, comprising means for making a stressing of the sample vary periodically.

7. Device according to claim 1, comprising a sample support mechanically decoupled from the enclosure.

8. Device according to claim 7, wherein the sample support is transparent to infrared radiation.

9. Device according to claim 1, wherein the heating means comprise temperature control means by servo-control by measurement of the temperature of the sample.

10. Device according to claim 1, wherein several infrared heating emitters are able to be oriented in direction and are located outside the enclosure.

11. Device according to claim 1, wherein the camera comprises a red and infrared light filter.

12. Device according to claim 1, comprising cooling means.

13. Device according to claim 12, wherein the enclosure is transparent to visible light and infrared light, the cooling means comprising means for cooling the sample by a coolant.

14. Device according to claim 13, wherein the cooling means comprise at least one coolant inlet arranged in the enclosure, and at least one outlet enabling the coolant to be removed from the enclosure.

15. Method for using a device according to claim 1, comprising assignment to each volume element of a reference code representative of grey levels detected by the camera when a first projection of the sequence of images is performed, and correlation of said reference codes with data acquired by the camera when subsequent projections of the sequence of images are performed on the surface of the sample so as to obtain the coordinates of said surface.

16. Method according to claim 15, comprising an alternation of first and second activation phases respectively of the first and second measuring means.

17. Method according to claim 15, comprising deposition of micrometric grains on the surface of the sample so that the grains are bonded to the surface.

18. Method according to claim 15, wherein, the sample being an electronic component, the method comprises making said electronic component operate, measurement by means of the first, second and/or third measuring means being performed when the electronic component is operating.

* * * * *

UNITED STATES PATENT AND TRADEMARK OFFICE
CERTIFICATE OF CORRECTION

| | |
|---|---|
| PATENT NO. | : 7,460,216 B2 |
| APPLICATION NO. | : 11/596725 |
| DATED | : December 2, 2008 |
| INVENTOR(S) | : Jean-Claude Lecomte and Romain Fayolle |

Page 1 of 1

It is certified that error appears in the above-identified patent and that said Letters Patent is hereby corrected as shown below:

Title Page

Item [22] change "PCT Filed: Nov. 23, 2005" to --PCT Filed: May 23, 2005--.

Item [30] at "Foreign Application Priority Data", change "May 24, 2004" to --May 25, 2004--.

Signed and Sealed this

Tenth Day of February, 2009

JOHN DOLL
*Acting Director of the United States Patent and Trademark Office*